United States Patent [19]
Proust

[11] Patent Number: 5,076,041
[45] Date of Patent: Dec. 31, 1991

[54] HITCH FOR A SINGLE-SHAFT HORSE-DRAWN VEHICLE

[76] Inventor: Stéphane Proust, 212 rue du Prieuré, Persan, France

[21] Appl. No.: 499,496
[22] PCT Filed: Dec. 23, 1988
[86] PCT No.: PCT/FR88/00638
§ 371 Date: Jun. 22, 1990
§ 102(e) Date: Jun. 22, 1990
[87] PCT Pub. No.: WO89/05748
PCT Pub. Date: Jun. 29, 1989

[30] Foreign Application Priority Data

Dec. 23, 1987 [FR] France .................. 87 10819

[51] Int. Cl.⁵ .............................................. B68B 1/00
[52] U.S. Cl. .................................................... 54/2
[58] Field of Search ................. 54/2, 54; 280/63, 75

[56] References Cited

U.S. PATENT DOCUMENTS

| | | | |
|---|---|---|---|
| 3,847,408 | 11/1974 | King | 54/2 X |
| 3,942,305 | 3/1976 | Cameron | 54/2 |
| 4,072,000 | 2/1978 | Clemens | 54/2 |
| 4,473,991 | 10/1984 | La Mura et al. | 54/2 |
| 4,662,157 | 5/1987 | Frigon et al. | 54/2 |

FOREIGN PATENT DOCUMENTS

| | | |
|---|---|---|
| 146784 | 6/1902 | Fed. Rep. of Germany . |
| 338948 | 12/1903 | France . |
| 2589418 | 5/1987 | France . |
| 16851 | 7/1912 | United Kingdom . |

Primary Examiner—Robert P. Swiatek
Attorney, Agent, or Firm—Gottlieb, Rackman & Reisman

[57] ABSTRACT

A hitch for a horse-drawn vehicle, which includes a single shaft (2) passing over a horse's back and connected at its front end to a harness (5, 6, 7) via a traction cradle (4) on which the single shaft (2) is rotatably mounted, and at its rear end to a horse-drawn vehicle (3). The cradle (4) comprises two arcuate frame members (9, 10) interconnected at their bottom ends for connection with a collar (5) to the harness and diverging progressively from each other to reach a maximum separation vertically above the horse's withers. An element (11) integral with the single shaft (2) is rotatably mounted on a member (12) interconnecting the two frame members (9, 10) at their point of maximum separation. The cradle rests on the horse's back via two pads (15, 16) swivel-mounted on the rear frame member (10) and situated on either side of the midline of the horse's back. The single shaft (2) carried by the cradle (4) is connected to a wheeled vehicle (3) via a shock absorber suspension.

11 Claims, 3 Drawing Sheets

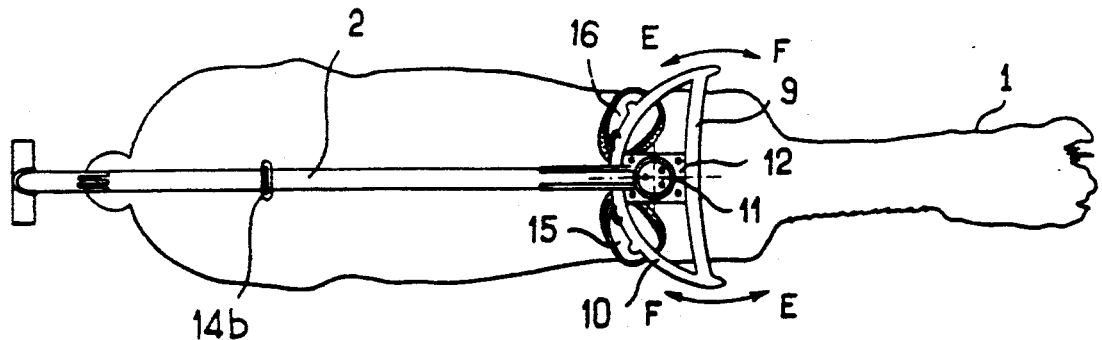
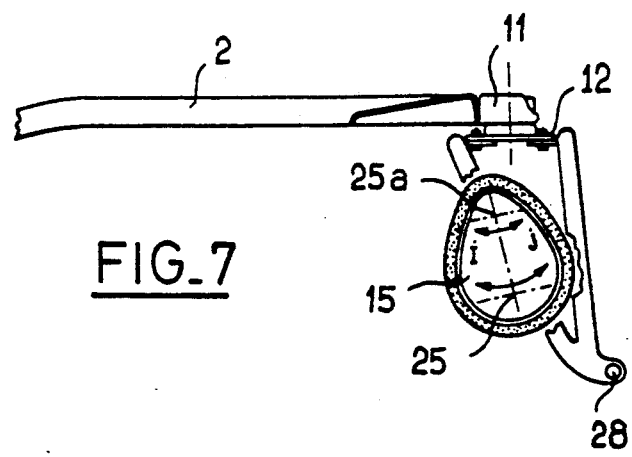
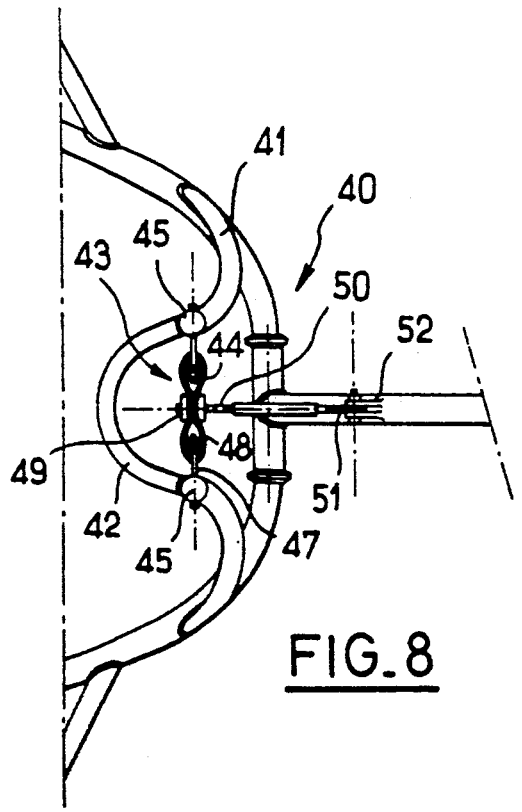
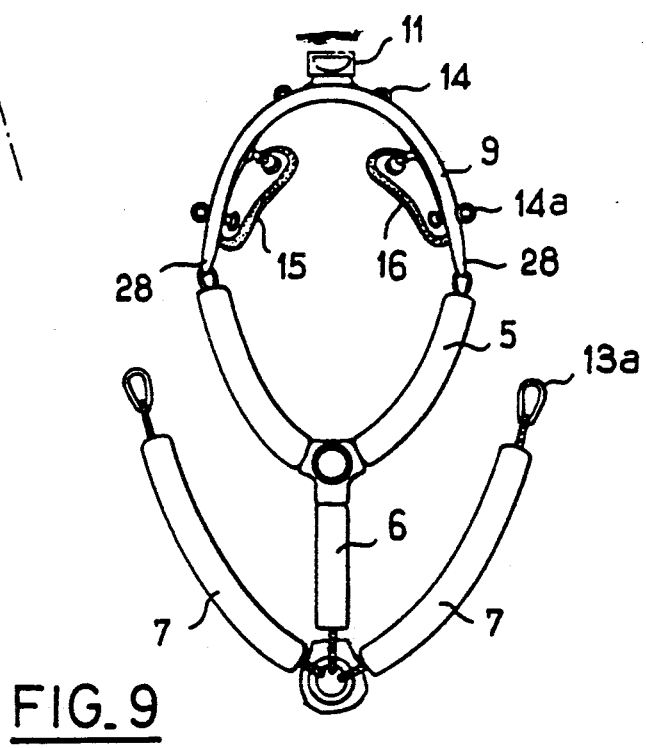

HITCH FOR A SINGLE-SHAFT HORSE-DRAWN VEHICLE

The present invention relates to a hitch for a horse-drawn vehicle having a single shaft passing over the horse's back.

A hitch of this type and a corresponding horse-drawn vehicle are described in Document FR-A-2 589 418.

The hitch comprises a single shaft passing over the horse's back with its leading end connected to a harness via a cradle on which the single shaft is mounted by means of a pivot, while its rear end is connected to a horse-drawn vehicle. Curved frame members rest directly on the horse's back and horse comfort is ensured by padding.

This hitch constitutes a distinct improvement over prior single-shaft hitches. In antiquity, a single shaft or pole was hitched to a throat collar but was very inefficient since it compressed the jugular veins of the horse so that hitch did not benefit fully from the tractive force of a horse. Other hitches have used a saddle analogous to that used in a conventional draft harness, placed on the horse's back and carrying the leading end of the single shaft on top. As with the charriots of antiquity, the horse's tractive efforts are not fully transmitted and as a general rule it is not possible to draw a vehicle heavier than a sulky.

French patent number 712 758 describes a traction cradle associated with a single shaft via a vertical hinge and having a pair of traces fixed thereto. This hitch is suitable for drawing agricultural implements, working at walking pace, but it is not usable at the other paces of the horse.

The main drawback of the hitch of FR-A-2 589 418 is that the padding of the frame members does not prevent the horse from getting sores in the long run because of the rubbing that takes place, and this naturally sets a limit on the uses to which the hitch may be put.

The invention therefore provides a device of the type described above in which the cradle comprises two arcuate frame members interconnected at their bottom ends in order to be connected to a harness and separating progressively from each other to reach maximum separation vertically over the horse's withers, an element integral with the single shaft being rotatably mounted on a member interconnecting the two frame members where they are at maximum separation, and the cradle rests on the horse's back by means of two pads swivel-mounted on the rear frame member which is disposed obliquely, the pads being situated on either side of the midline of the horse's back.

The inside face of each flap in contact with the horse's back is padded and has a convex right cross-section in the central zone of the pad in a plane perpendicular to the plane of the rear frame member, the lateral portions of the pads on either side of the frame members being concave in section in planes parallel to the plane of the frame member and having a concave right cross-section in the central zone of the pad in a plane parallel to the plane of the frame member, the top and bottom portions of the pad being convex in section in planes perpendicular to the plane of the frame member. Advantageously, the top portion of the pad forms a tip and its bottom portion forms a big end, giving the pad an egg-shape whose big end constitutes its base. Because of this shape, the pad has its central convex portion resting in the hollow situated between the horse's shoulder and its back, with the two lateral concave portions serving to receive the corresponding muscles against which the pad bears in turn as the horse moves. The central concave portion enables the pad to be positioned on the crossed-over muscles of the horse and the top and bottom convex portions put the pad into contact with the hollows situated on either side of the junctions between the superficial muscles of the horse's back, withers, and shoulder (respectively the great dorsal muscle, the trapezius and the triceps). Because of this shape and because of the swivel connection between the pad and its support, the horizontal back-and-forth displacement of the shoulder blade causes the pad to rock about the rear frame member while keeping the pad in contact with the horse's back.

In order to facilitate rocking about the axis of the rear frame member, the pad is pivotally mounted at two points, and preferably by means of two ball-and-socket joints, one of which is fixed on the frame member and moves on the pad while the other is fixed on the pad and moves on the frame member.

In order to further facilitate the traction effort of the horse, the single shaft carried by the cradle is advantageously connected to the wheeled vehicle by means of a suspension and shock-absorbing coupling. This coupling preferably includes a loop of elastic stretched along an axis perpendicular to the longitudinal axis of the single-shaft horse-drawn vehicle hitch, between two fixing points on the said vehicle. An adjustable balance device connects the central portion of the loop of elastic to the single shaft.

Other advantages and characteristics of the present invention appear from reading the following detailed description made with reference to the accompanying drawings, in which:

FIGS. 6 and 7 are diagrams showing the movements of the horse's shoulders and of the pads of the traction cradle, respectively;

FIG. 8 is a plan view on a larger scale showing the shock absorber; and

FIG. 9 is a front view showing how the harness is fixed to the traction cradle.

Figure 1:
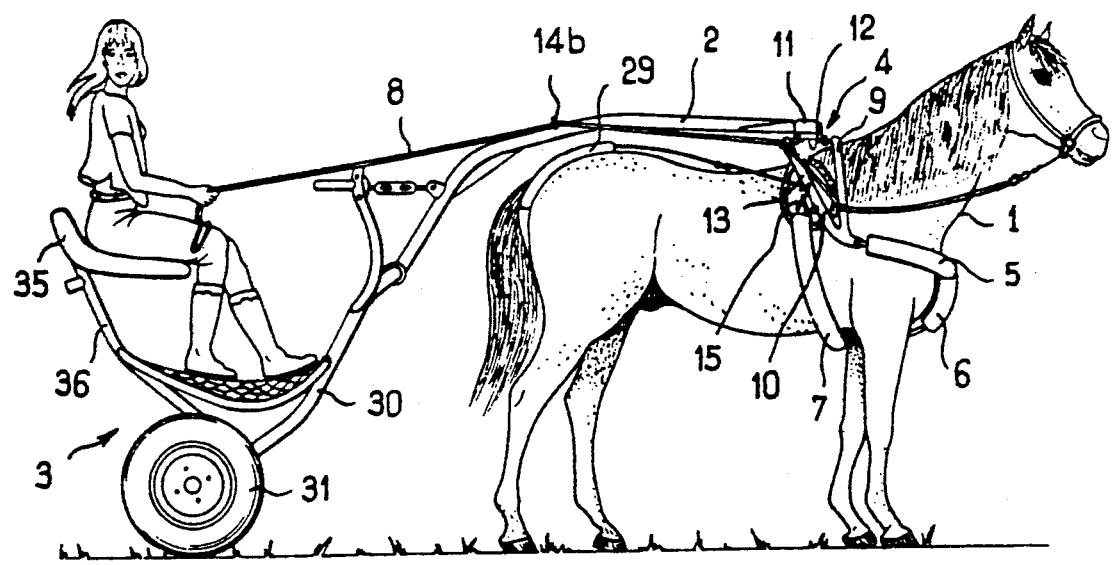
FIG. 1 is an overall side view of a horse and sulky hitched using a traction cradle of the invention.

FIG. 1 shows a horse 1 hitched to a two-wheel horse-drawn vehicle 3 via a single shaft 2. This single shaft rests on the horse via a traction cradle 4, a breast collar 5, 6, and a girth strap 7, with the breast collar and the girth strap constituting the harness. Reins 8 are used for driving the horse in conventional manner.

The traction cradle 4 comprises two arcuate frame members 9 and 10 interconnected at their bottom ends where they are connected to the breast collar 5, and splaying apart from each other to a maximum separation distance over the horse's withers, with the rear frame member 10 having a smaller radius of curvature as seen from above (FIG. 2), than the front frame member 9. The front frame member lies in a plane which differs little from the vertical, whereas the rear frame member is at a distinct slope relative to the vertical. A pivot 11 connected to the single shaft 2 is mounted on a member 12 (e.g. a plate) interconnecting the two arcuate frame members 9 and 10 at their point of maximum separation, and serves to allow the single shaft to rotate relative to the horse. This cradle structure comprising two arcuate frame members is advantageous from the economic point of view and from the point of view of lightness, but it could be replaced by a solid structure on which a rear sloping arc can be defined, even if it does not appear directly.

The reins 8 pass over respective sides of the cradle via "terrets" (i.e. rein-guiding loops) 14a on the front frame member, via terrets 14 on the rear frame member (FIG. 2) and then both via a common terret 14b on the single shaft 2.

Figure 4:
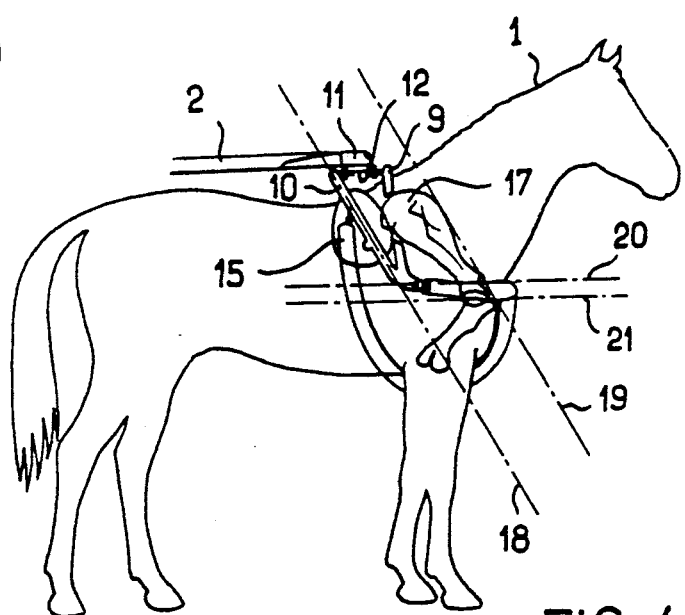
FIG. 4 is a side view showing how the traction cradle of the invention is positioned relative to the horse's anatomy.

The traction cradle 4 bears against the horse's back via two pads 15 and 16 both mounted on the rear frame member 10 and disposed symmetrically on either side of the midline of the horse's back. Each pad bears against the hollow in the horse's anatomy situated behind its shoulder blade 17 (FIG. 4), and the inside face of the pad which comes into contact with the horse's back is padded to have various convex and concave portions. The pads 15 and 16 are preferably generally eggshaped having a tip 22 and a big end 23, the big end constituting the base of each pad.

Each of the pads 15 and 16 is mounted on the rear frame member by means of two swivel mounts, e.g. two ball-and-socket joints 24 mounted on fixed rods 25 and 25a. The rod 25a near the top of the pad 15 or 16 and the rod 25 near the base of the pad are mounted in opposite directions, i.e. the rod 25a is mounted on the frame member and its ball is received on the pad, whereas the rod 25 is mounted on the pad and its ball is received on the frame member. The lengths of the fixed rods may be adjusted by screw thread means, thereby enabling standardized cradles to be manufactured for any horse's back.

As mentioned above, each pad 15, 16 has padding 26 fitted over the inside of a base plate 27 with the plate and the padding being shaped so as to match a horse's anatomy behind its shoulder blade. To do this, the inside faces of the pads where they come into contact with the horse's back are padded to have a convex right section in the central portion of the pad in a plane perpendicular to the plane of the rear frame member, with the lateral portions of the pad on either side of the frame member having a concave section in the plane of the frame member, and a concave right section in the central zone of the pad in a plane parallel to the plane of the frame member, while the top and bottom portions of the pad have convex sections in planes perpendicular to the plane of the frame member.

When the horse moves forwards, and regardless of its pace (walking, trotting, cantering), its shoulders move forwards in turns each following a path as represented diagrammatically in FIG. 6 by arrows E-F. By virtue of their ball-and-socket swivel mounts, the pads follow the movements of the horse's shoulder blades by rocking about the axis interconnecting the two swivels, with a pad rocking forwards when the corresponding shoulder moves forwards and backwards when it moves backwards. This is shown diagrammatically in FIG. 7 by arrows I and J, with the swivel points being symbolized by the rods 25 and 25a. Because the ball of the rod 25a is mounted on the pad, the rocking motion at the tip of the pad is of smaller amplitude than the rocking motion at its base, and this corresponds to the fact that the amplitude of horse shoulder blade movement is smaller at the level of the tip of the pad than it is at the base of the pad.

Figure 5:
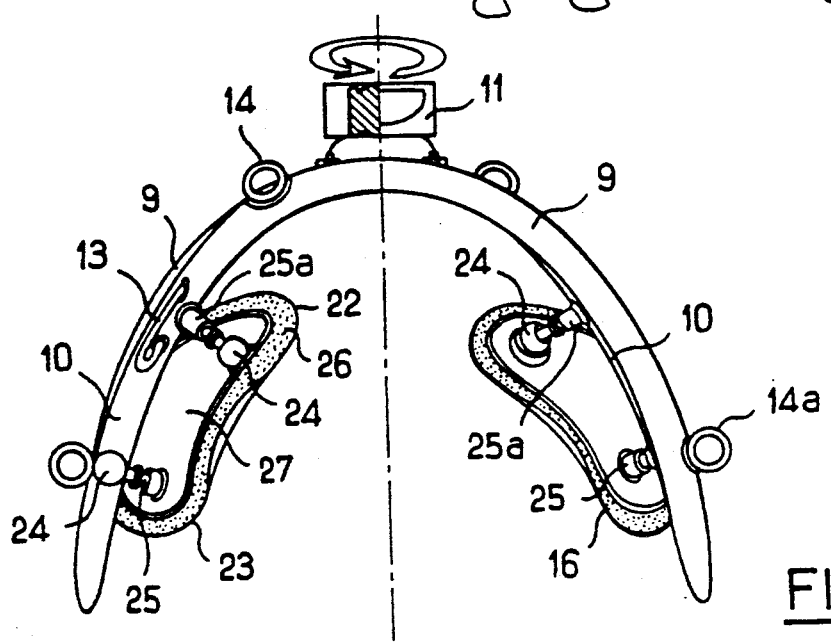
FIG. 5 is a front view (righthand side) of the traction cradle of the invention and a rear view thereof (lefthand side)

The traction cradle 4 is held in place on the horse by means of a breast collar 5, 6 and a girth 7 (FIG. 9). The collar is preferably an American type hunting collar (or "breast plate"), i.e. a collar having two side portions 5 interconnected by a ring and permanently fixed by conventional means to eyeholes provided at the ends 28 of the common portions of the two frame members 9 and 10. A belly-strap 6 is fitted to the ring of the breast collar and passes between the horse's front legs to be connected by means of a loop or any other appropriate device to the girth 7. The girth is fixed by fasteners or hooks 13a to rings 13 (FIG. 5) provided on the rear frame member 10 between the swivel-mounted pads. In order to hitch a horse to the single shaft, the collar and cradle assembly is passed over the horse's head and then the hooks 13a on the girth are engaged on either side in the rings 13 on the frame member 10. This ensures that the cradle is properly positioned laterally on the horse, and a crupper 29 also connected to the rings 13 ensures that the cradle is properly positioned longitudinally.

In order to make the most of the horse's tractive effort, the ends 28 of the frame members lie on a horizontal axis 20 passing through the base of the horse's neck and the major portion of the breast collar lies between said horizontal axis 20 and the horizontal axis 21 passing through the point of the shoulder.

The hunting type breast-plate configuration for the breast collar may be replaced by a one-piece breast strap as is conventionally used for traction, but in that case the horse's effort is applied at the base of the neck. It is therefore preferred to use a hunting type collar (as used for horses being ridden) where the effort is spread over both shoulders.

The single shaft 2 is connected to the horse-drawn vehicle 3 via a shock absorber and an adjustable balancing device which are described below after a short description of the vehicle itself.

Figure 2:
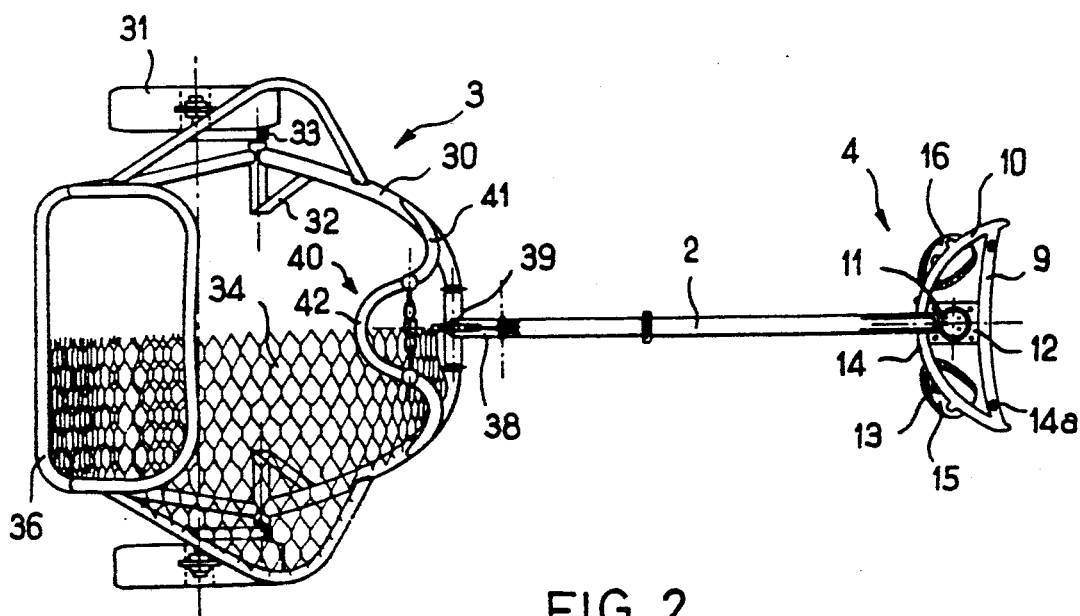
FIG. 2 is a plan view of the single-shaft horse-drawn vehicle using the traction cradle of the invention.
Figure 3:
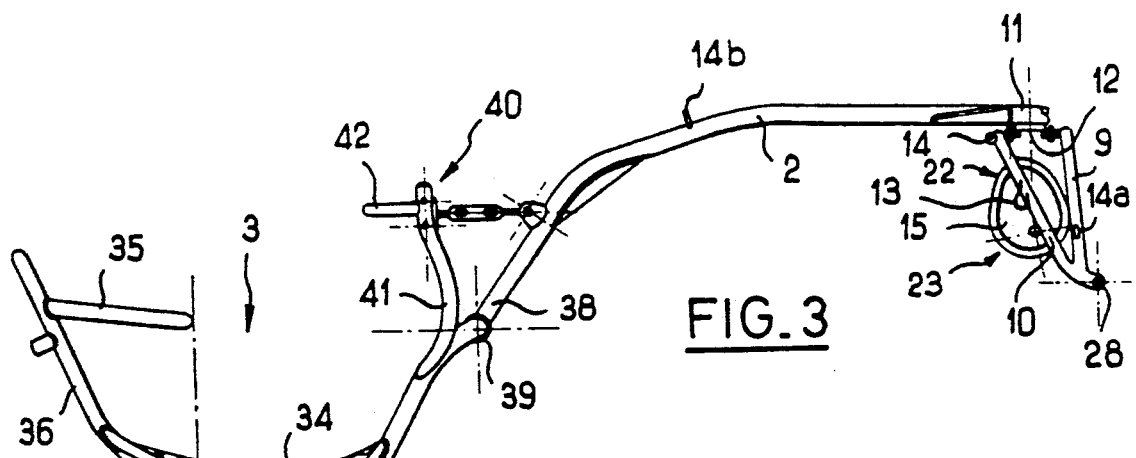
FIG. 3 is a side view of the equipment shown in FIG. 2.

The vehicle is constituted by a chassis 30 mounted via suspension springs 33 and lever arms 32 on two wheels 31 having pneumatic tires. A floor 34, e.g. of wire mesh (shown for half of the vehicle in FIG. 2) enables one or more people to take their places. A seat 35 is provided on rear risers 36 of the chassis (FIG. 2 shows only the seat support structure) such that the weight of the passenger(s) passes essentially vertically (plane 37) above the axis of the wheels 31 (FIG. 3).

The rear end 38 of the single shaft 2 is fixed to the chassis 30 at 39. As can be seen in the drawings, the general shape of the single shaft matches that of the horse, and the rear end 38 of the shaft slopes relative to the vertical. A support element 40 is mounted at the front of the chassis 30. This element 40 comprises two substantially vertical side portions 41 and a substantially horizontal central portion 42 in the form of an arc of a circle which is open toward the front of the vehicle.

This arcuate portion may be used as a rail by the passengers, but its essential function is to support the shock absorber. The shock absorber 43 (shown on a larger scale in FIG. 8) is constituted by a piece of elastic 44 stretched perpendicularly to the longitudinal axis of the vehicle between the two ends 45 of the circular arc 42. The piece of elastic is advantageously constituted by a loop of rubber, or a band of rubber, or of some other elastomer, which is folded over itself and connected to the points 45 by fixing members 46 passing through the loop. These fixing members 46 may be rods 47 passing through the loop and having threaded ends held in place by nuts 48, as shown in FIG. 8 by way of example.

The central portion of the loop of elastic 44 is compressed between two washers 49 with a pin 50 passing through the central holes thereof and rigidly connected to the single shaft 2. The end 51 of the pin 50 which is fixed to the shaft is mounted to rotate on a plate 52 which is fixed to the shaft (e.g. by having a bolt passing through a hole in the plate) at substantially the same level as the horse's shoulder. In this way, the jerky alternating tractive motion of the horse is transmitted to the piece of elastic which damps this motion so that the vehicle is pulled smoothly without jerking.

The length of the pin 50 is adjustable, e.g. by including a turnbuckle type arrangement in its middle, thereby enabling the plate 52 to be moved closer to or further away from the piece of elastic 44. This makes it possible to adjust the balance of the horse-drawn vehicle as a function of the horse, of the number and weight of the passengers, etc. . . . , so that the front of the seat lies vertically over the center of the wheels (plane 37). In addition, the driver always has the possibility of changing this balance by taking up an appropriate position in the vehicle, either sitting or standing, bearing against the middle of the floor 34, on its upwardly sloping front portion, or on one or other of its side portions projecting over the wheels 31 (see FIG. 2).

The horse-drawn vehicle, the single shaft, and the traction cradle are shown in the drawings as being made of steel tubing. This solution is simple and easy to implement and makes it possible to combine lightness with adequate strength while making it easier to obtain rounded shapes adapted both to the horse's body for the shaft and the traction cradle, and to the requirements of ease at handling and vehicle safety. The rounded side portions projecting over the wheels and dipping towards the ground enable the vehicle to clear such obstacles as it may strike accidently (rocks, trees, . . . ).

By way of example, the rotary element 11 may be a ball bearing fixed to the plate 12 by four bolts, but other devices enabling the cradle to be fixed to a single shaft and allowing the shaft freedom to rotate about its point of swivel on the cradle may naturally be considered.

The items constituting the harness, the hunting type breast collar and the girth are made and assembled in conventional manner and are padded to improve horse comfort.

Naturally the dimensions of the vehicle, of the single shaft, and of the cradle need to match the size of the horse. However because of the swivel-mounted pads, there is no difficulty in making do with different sizes for different types of horse only (small pony, large pony, horse, . . . ).

The hitch described herein provides very great freedom of movement since the horse has practically the same freedom of movement as a horse that is ridden and the shape and structure of the vehicle enables the horse to go almost anywhere (so long as the available path is as wide as the vehicle), on the road, in forests, over the fields, etc. . . . .

I claim:

1. A hitch for a horse-drawn vehicle comprising a single shaft passing over the back of a horse and connected at its front end to a harness by means of a traction cradle to which the single shaft is rotatable mounted, and at its rear end to a horse-drawn vehicle, the cradle comprising two arcuate front and rear frame members interconnected at their bottom ends in order to be connected to a collar of the harness and diverging progressively from each other to reach a maximum separation vertically over the horse's withers, an element integral with the single shaft being rotatably mounted on a member interconnecting the two frame members where they are at maximum front to rear separation (i.e. over the withers), wherein the cradle rests on the superficial muscles where the horse's back, withers, and shoulders meet by means of two pads connected by swivel mounts to the rear frame member which is disposed obliquely and practically parallel to the axis running from the horse's shoulder blade to the point of its shoulder, the pads being situated on either side of the midline of the horse's back.

2. A hitch according to claim 1, wherein the inside face of each pad in contact with the horse's back is padded and has a convex right cross-section in the central zone of the pad in a plane perpendicular to the plane of the rear frame member, the lateral portions of the pads on either side of the rear frame member being concave in section in planes parallel to the plane of the frame member and having a concave right cross-section in the central zone of the pad in a plane parallel to the plane of the rear frame member, the top and bottom portions of the pad being convex in section in planes perpendicular to the plane of the rear frame member.

3. A hitch according to claim 1 or 2, wherein the pads are generally egg-shaped, each having a tip and a big end, with the big end constituting the base of the pad.

4. A hitch according to claim 3, wherein each pad is connected to the rear frame member of the cradle at two points by respective swivel mounts.

5. A hitch according to claim 4, wherein one of the swivel mounts is fixed on the rear frame member and moves on the pad, while the other is fixed on the pad and moves on the rear frame member.

6. A hitch according to claim 5, wherein the points where the cradle is connected to the collar lie on the same horizontal level as the base of the horse's neck.

7. A hitch according to claim 1, wherein the single shaft carried by the cradle is connected to a wheeled vehicle via a shock-absorbing suspension.

8. A hitch according to claim 7, wherein the shock-absorbing suspension includes a piece of elastic stretched along an axis perpedicular to the longitudinal axis of the single-shaft horse-drawn vehicle hitch between two fixing points on said vehicle.

9. A hitch according to claim 7 or 8, wherein the shock-absorbing suspension is connected to the single shaft via an adjustable balancing device.

10. A hitch according to claim 1, wherein the collar is an American type hunting collar or "breast plate".

11. A hitch according to claim 1, wherein a girth is removably fixed to rings carried by the rear frame member of the traction cradle, the rings lying intermediate the swivel mounts between the rear frame member and each of the pads.

* * * * *